(12) United States Patent
Fernandez

(10) Patent No.: US 12,286,018 B2
(45) Date of Patent: Apr. 29, 2025

(54) OVER-VOLTAGE PROTECTION CIRCUIT FOR ELECTRIC VEHICLES

(71) Applicant: Ample Inc., San Francisco, CA (US)

(72) Inventor: Manuel Cereijido Fernandez, San Francisco, CA (US)

(73) Assignee: Ample Inc., San Francisco, CA (US)

( * ) Notice: Subject to any disclaimer, the term of this patent is extended or adjusted under 35 U.S.C. 154(b) by 235 days.

(21) Appl. No.: 18/186,468

(22) Filed: Mar. 20, 2023

(65) Prior Publication Data

US 2024/0317061 A1 Sep. 26, 2024

(51) Int. Cl.
| | |
|---|---|
| *B60L 3/04* | (2006.01) |
| *B60L 3/00* | (2019.01) |
| *H02H 3/20* | (2006.01) |
| *H02H 9/04* | (2006.01) |
| *H02J 7/00* | (2006.01) |

(52) U.S. Cl.
CPC ............. *B60L 3/04* (2013.01); *B60L 3/0046* (2013.01); *H02H 3/202* (2013.01); *H02H 9/041* (2013.01); *H02J 7/00308* (2020.01)

(58) Field of Classification Search
CPC ........ H02J 7/00; H02J 7/00308; H02J 7/0031; H02H 3/20; H02H 3/22; H02H 7/20; H02H 3/38; H02H 9/04; H02H 3/202; H02H 9/041; H02H 3/087; B60L 3/04
USPC ........................................................ 361/91.1
See application file for complete search history.

(56) References Cited

U.S. PATENT DOCUMENTS

| | | | |
|---|---|---|---|
| 4,667,129 A * | 5/1987 | Papillon | B60Q 1/143 |
| | | | 315/77 |
| 6,037,750 A | 3/2000 | Von Novak | |
| 6,331,365 B1 | 12/2001 | King | |
| 6,631,775 B1 | 10/2003 | Chaney | |
| 6,700,351 B2 | 3/2004 | Blair et al. | |
| 7,535,199 B2 | 5/2009 | Kimura et al. | |
| 7,553,583 B2 | 6/2009 | Eaves | |
| 7,598,706 B2 | 10/2009 | Koski et al. | |
| 8,004,238 B2 | 8/2011 | Kim et al. | |
| 8,120,322 B2 | 2/2012 | Lee et al. | |

(Continued)

FOREIGN PATENT DOCUMENTS

| | | |
|---|---|---|
| KR | 10-2019-0123401 A | 11/2019 |
| WO | 2022211269 A1 | 10/2022 |

OTHER PUBLICATIONS

ISR, International Search Report for PCT App. No. PCT/US2024/017802, dated Jun. 20, 2024.

*Primary Examiner* — Danny Nguyen
(74) *Attorney, Agent, or Firm* — Intrinsic Law Corp.

(57) ABSTRACT

An over-voltage protection circuit is electrically connected to one or more batteries and to a high-voltage bus to power the electrical components of an electric vehicle. The over-voltage protection circuit is configured to produce a short-circuit path for current flowing through the high-voltage bus when the voltage across the high-voltage bus is higher than a threshold voltage. The short-circuit path significantly increases the current flowing through the high-voltage bus, which causes one or more fuses to interrupt current flow. The over-voltage protection circuit includes an energy-harvesting circuit that down-converts the voltage across the high-voltage bus to a lower voltage that can power one or more electrical components of the over-voltage protection circuit.

21 Claims, 14 Drawing Sheets

(56) References Cited

U.S. PATENT DOCUMENTS

| | | | |
|---|---|---|---|
| 8,138,719 B2 | 3/2012 | Sano et al. | |
| 8,143,851 B2 | 3/2012 | Greening et al. | |
| 8,146,694 B2 | 4/2012 | Hamidi | |
| 8,212,571 B2 | 7/2012 | Emori et al. | |
| 8,294,295 B2 | 10/2012 | Xiao | |
| 8,330,417 B2 | 12/2012 | Athas et al. | |
| 8,384,350 B2 | 2/2013 | Shin et al. | |
| 8,994,300 B2 | 3/2015 | Ohkura | |
| 9,024,586 B2 | 5/2015 | Vance et al. | |
| 9,315,113 B2 | 4/2016 | Shrinkle | |
| 9,694,707 B2 | 7/2017 | Shrinkle | |
| 2007/0257642 A1 | 11/2007 | Xiao et al. | |
| 2008/0180061 A1 | 7/2008 | Koski et al. | |
| 2009/0093944 A1 | 4/2009 | Sykes et al. | |
| 2009/0160262 A1 | 6/2009 | Schmidt et al. | |
| 2010/0072970 A1 | 3/2010 | Ouyang | |
| 2011/0080139 A1 | 4/2011 | Troxel et al. | |
| 2011/0270480 A1 | 11/2011 | Ishibashi et al. | |
| 2012/0034481 A1 | 2/2012 | Higa et al. | |
| 2012/0161708 A1 | 6/2012 | Miura et al. | |
| 2012/0262121 A1 | 10/2012 | Kuo et al. | |
| 2012/0293130 A1 | 11/2012 | Burstein et al. | |
| 2013/0002203 A1 | 1/2013 | Kuraishi | |
| 2013/0062939 A1 | 3/2013 | Engler et al. | |
| 2013/0134943 A1 | 5/2013 | Maloizel et al. | |
| 2013/0154567 A1 | 6/2013 | Peterson et al. | |
| 2013/0181513 A1 | 7/2013 | Yano | |
| 2013/0328529 A1 | 12/2013 | Zbrozek | |
| 2014/0015488 A1 | 1/2014 | Despesse | |
| 2014/0175873 A1 | 6/2014 | Kishimoto et al. | |
| 2015/0380935 A1 | 12/2015 | Calhoun et al. | |
| 2016/0285254 A1* | 9/2016 | Ishikawa | B25J 19/06 |
| 2017/0267105 A1 | 9/2017 | Fratelli et al. | |
| 2019/0027922 A1 | 1/2019 | Johansson et al. | |

\* cited by examiner

OVER-VOLTAGE PROTECTION CIRCUIT FOR ELECTRIC VEHICLES

TECHNICAL FIELD

This application relates generally to electric vehicles and their battery components.

BACKGROUND

Electric vehicles (EVs) use batteries to provide electrical energy to drive the motor, lights, and other electrical components. The electrical energy is provided at a high voltage and current. When the voltage of the electrical energy is higher than a target voltage window, there is a risk that the electrical components of the EV will become damaged. In addition to the cost of replacing the damaged electrical components, the damaged electrical components can compromise the safety of the EV.

SUMMARY

Example embodiments described herein have innovative features, no single one of which is indispensable or solely responsible for their desirable attributes. The following description and drawings set forth certain illustrative implementations of the disclosure in detail, which are indicative of several exemplary ways in which the various principles of the disclosure may be carried out. The illustrative examples, however, are not exhaustive of the many possible embodiments of the disclosure. Without limiting the scope of the claims, some of the advantageous features will now be summarized. Other objects, advantages and novel features of the disclosure will be set forth in the following detailed description of the disclosure when considered in conjunction with the drawings, which are intended to illustrate, not limit, the invention.

An aspect of the invention is directed to an over-voltage protection circuit comprising: a fuse having a first terminal electrically connected to one or more batteries and a second terminal electrically connected to a high-voltage bus to power a motor; a trigger circuit electrically connected to the high-voltage bus, the trigger circuit having a conducting state when a voltage of the high-voltage bus is higher than a threshold voltage and a non-conducting state when a voltage of the high-voltage bus is lower than the threshold voltage; an energy-harvesting circuit electrically connected to the high-voltage bus; a driver circuit electrically connected to an output of the trigger circuit and an output of the energy-harvesting circuit; a gate-hold circuit electrically connected to an output of the driver circuit and the output of the energy-harvesting circuit; and a short-circuit path electrically connected to an output of the gate-hold circuit, the short-circuit path having a first state in which the short-circuit path is electrically disconnected from the high-voltage bus and a second state in which the short-circuit path is electrically connected to the high-voltage bus, wherein when the trigger circuit is in the conducting state, one or more transistors in the driver circuit is/are activated to charge a buffer capacitor in the gate-hold circuit, the buffer capacitor producing a buffer-capacitor voltage that is higher than a threshold voltage of the short-circuit path to thereby transition the short-circuit path from the first state to the second state, the short-circuit path in the second state causing a current through the high-voltage bus to increase above a current rating of the fuse to electrically disconnect the one or more batteries from the high-voltage bus.

In one or more embodiments, the trigger circuit includes a Zener diode having a cathode electrically connected to the high-voltage bus and an anode electrically connected to the driver circuit, the Zener diode configured to transition from the non-conducting state to the conducting state at the threshold voltage such that a current flows through a reverse-biased Zener diode. In one or more embodiments, the Zener diode is electrically connected in series with a first conductive line, the first conductive line electrically connected to the high-voltage bus. In one or more embodiments, the driver circuit includes an NPN transistor having a base terminal electrically connected in series with a second conductive line, the second conductive line electrically connected to the first conductive line. In one or more embodiments, the Zener diode is electrically connected in series with a first resistor, and a second resistor is electrically connected in series with the second conductive line.

In one or more embodiments, the driver circuit further comprises a third conductive line electrically connected to a collector terminal of the NPN transistor, and third and fourth resistors are electrically connected in series with the third conductive line. In one or more embodiments, the energy-harvesting circuit includes a voltage divider and the third conductive line is electrically coupled to an output of the voltage divider.

In one or more embodiments, a fourth conductive line is electrically connected to the third conductive line between respective terminals of the third and fourth resistors, the fourth conductive line electrically connected to a gate terminal of a p-channel field-effect transistor (PFET). In one or more embodiments, a fifth resistor electrically connected in series with the fourth conductive line, the current producing a gate-to-source voltage across the fourth resistor that is configured to transition the PFET from a non-conducting state to a conducting state.

In one or more embodiments, the circuit further comprises a fifth conductive line electrically connected to a drain terminal of the PFET; and a sixth conductive line electrically connected to a gate terminal of an n-channel field-effect transistor (NFET), the sixth conductive line electrically connected to the fifth conductive line. In one or more embodiments, the circuit further comprises a sixth resistor electrically connected in series with the fifth conductive line between the drain terminal of the PFET and the sixth conductive line; a seventh resistor connected in series with the fifth conductive line between the sixth conductive line and ground; and an eighth resistor electrically connected in series with the sixth conductive line between the gate terminal of the NFET and the fifth conductive line, wherein the current produces a gate voltage across the seventh resistor that is configured to transition the NFET from a non-conducting state to a conducting state.

In one or more embodiments, the circuit further comprises a seventh conductive line electrically connected to the high-voltage bus and a drain terminal of the NFET; and a ninth resistor electrically connected in series with the seventh conductive line. In one or more embodiments, the circuit further comprises an eighth conductive line electrically connected to the output of the voltage divider; and a capacitor electrically connected in series with the eighth conductive line. In one or more embodiments, the circuit further comprises a ninth conductive line electrically connected to the eighth conductive line and to a source terminal of the NFET; and a buffer capacitor electrically connected to the ninth conductive line.

In one or more embodiments, the circuit further comprises the buffer capacitor is a first buffer capacitor, a second capacitor is electrically connected to the ninth conductive line, and a tenth resistor is electrically connected in series with the ninth conductive line, the tenth resistor between the first and second buffer capacitors. In one or more embodiments, the circuit further comprises a tenth conductive line electrically connected to the ninth conductive line; an eleventh resistor electrically connected in series with the tenth conductive line; an eleventh conductive line electrically connected to the ninth conductive line, the tenth and eleventh conductive lines in parallel electrically with each other; a twelfth resistor electrically connected in series with the eleventh conductive line; and a twelfth conductive line electrically connected to the tenth and eleventh conductive lines and to the short-circuit path.

In one or more embodiments, the circuit further comprises a diode electrically connected in series with the eleventh conductive line, wherein an anode of the diode is electrically connected to the twelfth resistor. In one or more embodiments, the short-circuit path includes a silicon-controlled rectifier (SCR), the SCR having a gate terminal electrically connected to the twelfth conductive line, and the current produces a voltage at the twelfth conductive line that is configured to transition the SCR from a non-conducting state to a conducting state. In one or more embodiments, a cathode of the SCR is electrically connected to ground; and an anode of the SCR is electrically connected to a thirteenth conductive line, the thirteenth conductive line electrically connected to the high-voltage bus. In one or more embodiments, the diode is a first diode, and the circuit further comprises: an inductor electrically connected in series with the thirteenth conductive line; and a second diode electrically connected in parallel with the inductor, the second diode having an anode electrically connected to the thirteenth conductive line and a cathode electrically connected to the high-voltage bus.

Another aspect of the invention is directed to an over-voltage protection circuit comprising: a plurality of fuses, each fuse having a respective first terminal electrically connected to a respective battery and a second terminal electrically connected to a high-voltage bus to power a motor; a trigger circuit electrically connected to the high-voltage bus, the trigger circuit having a conducting state when a voltage of the high-voltage bus is higher than a threshold voltage and a non-conducting state when a voltage of the high-voltage bus is lower than the threshold voltage; an energy-harvesting circuit electrically connected to the high-voltage bus; a driver circuit electrically connected to an output of the trigger circuit and an output of the energy-harvesting circuit; a gate-hold circuit electrically connected to an output of the driver circuit and the output of the energy-harvesting circuit; and a short-circuit path electrically connected to an output of the gate-hold circuit, the short-circuit path having a first state in which the short-circuit path is electrically disconnected from the high-voltage bus and a second state in which the short-circuit path is electrically connected to the high-voltage bus, wherein when the trigger circuit is in the conducting state, one or more transistors in the driver circuit is/are activated to charge a buffer capacitor in the gate-hold circuit, the buffer capacitor producing a buffer-capacitor voltage that is higher than a threshold voltage of the short-circuit path to thereby transition the short-circuit path from the first state to the second state, the short-circuit path in the second state causing a current through the high-voltage bus to increase above a current rating of one or more respective fuses to electrically disconnect one or more respective batteries from the high-voltage bus, the one or more respective batteries causing the voltage of the high-voltage bus to be higher than the threshold voltage.

BRIEF DESCRIPTION OF THE DRAWINGS

For a fuller understanding of the nature and advantages of the concepts disclosed herein, reference is made to the detailed description of preferred embodiments and the accompanying drawings.

DETAILED DESCRIPTION

An over-voltage protection circuit is electrically connected to the batteries in the EV and to a high-voltage bus that supplies electrical power to the EV's electrical components including the motor. The over-voltage protection circuit includes one or more fuses, a trigger circuit, a driver circuit, a gate-hold circuit, an energy-harvesting circuit, and a short-circuit path. Each fuse is electrically connected in series with a respective battery or a respective group of batteries. The trigger circuit, the driver circuit, the gate-hold circuit, the energy-harvesting circuit, and the short-circuit path are electrically connected in parallel with the high-voltage bus.

The trigger circuit is electrically connected to the high-voltage bus. When the voltage across the high-voltage bus is lower than a threshold voltage, the trigger circuit is in a non-conducting state. When the voltage across the high-voltage bus is higher than or equal to the threshold voltage, the trigger circuit is in a conducting state.

The driver circuit is electrically connected to an output of the trigger circuit. The driver circuit includes one or more transistors that are configured to be activated when the trigger circuit is in the conducting state and current flows into the driver circuit.

The gate-hold circuit is electrically connected to an output of the driver circuit. The gate-hold circuit includes one or more capacitors and/or other energy-storage devices that is/are configured to be charged to a predetermined voltage that drives a state of the short-circuit path.

The short-circuit path has a first state in which the short-circuit path is electrically decoupled from the high-voltage bus and a second state in which the short-circuit path is electrically coupled to the high-voltage bus. The energy stored in the gate-hold circuit enables the short-circuit path to transition from the first state to the second state. When the short-circuit path is in the second state, a low-resistance path is formed such that the current flows through the short-circuit path. When the current flowing through the high-voltage bus exceeds the current rating of the fuse, the fuse will be blown. The current will be interrupted and the overvoltage event will be controlled.

The energy-harvesting circuit is configured to down-convert the high voltage from the high-voltage bus to a lower voltage that can be used to drive the electrical components of the driver circuit and the gate-hold circuit.

Figure 1:
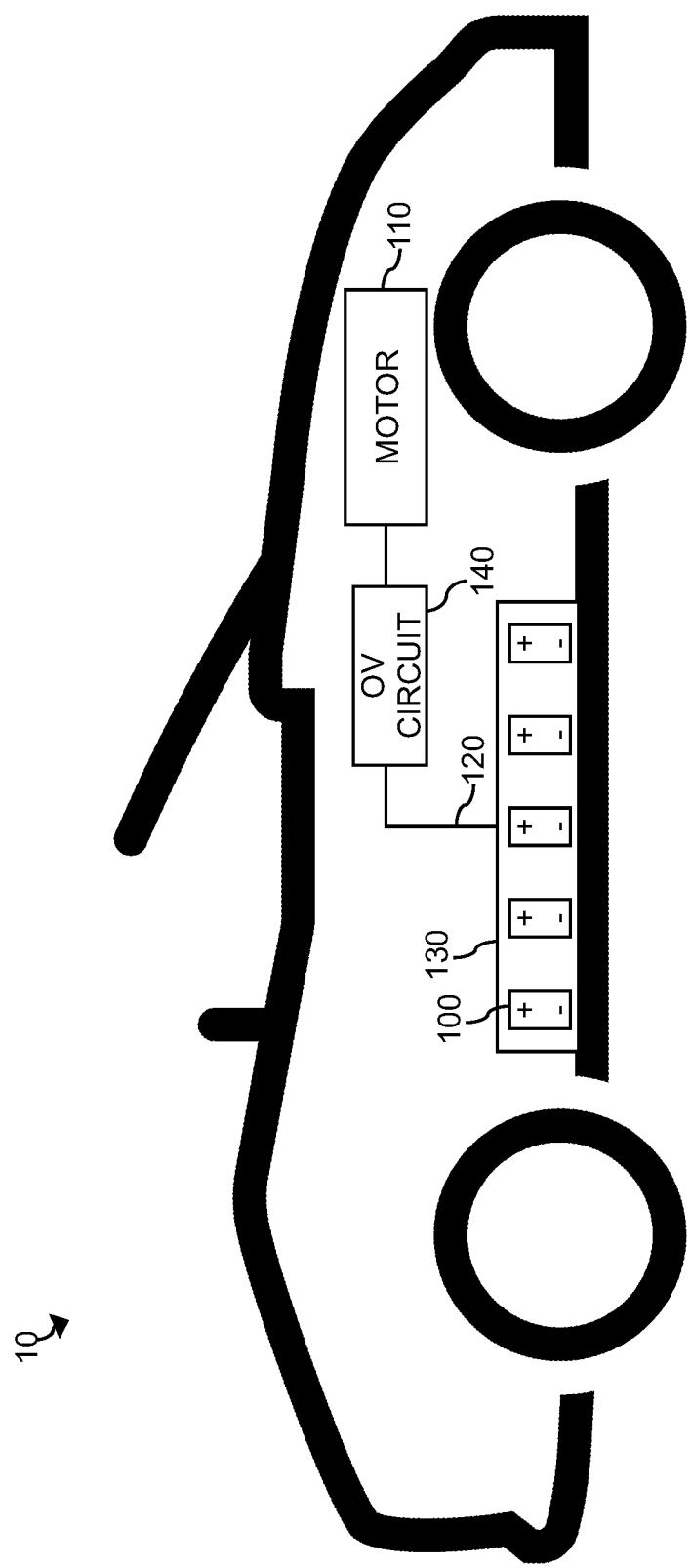
FIG. 1 is a side view of an electric vehicle according to an embodiment.

FIG. 1 is a side view of an EV 10 according to an embodiment. The EV is transparent to illustrate certain internal components. The EV 10 includes multiple batteries 100 that provide electrical power to a motor 110 and other electrical components of the EV's powertrain through a high-voltage bus 120. The batteries 100 are electrically connected and/or electrically coupled in parallel to the high-voltage bus 120. The batteries 100 can be or can include battery modules that can be formed of multiple battery cells. The batteries 100 can be located in a housing 130 in the EV 10 and/or mechanically secured to the EV 10.

An over-voltage protection circuit or device 140 is electrically connected in parallel with the high-voltage bus 120. The over-voltage protection circuit 140 is configured to electrically disconnect one, some, or all of the batteries 100 from the motor 110 and other electrical components of the EV 10 when the voltage across the high-voltage bus 120 is higher than a predetermined maximum voltage. Electrically disconnecting the battery(ies) 100 from the motor 110 when the voltage across the high-voltage bus 120 is higher than a predetermined maximum voltage can prevent damage to the motor 110 and/or other electrical components of the EV's powertrain and can improve safety of the EV's operation.

Figure 2:
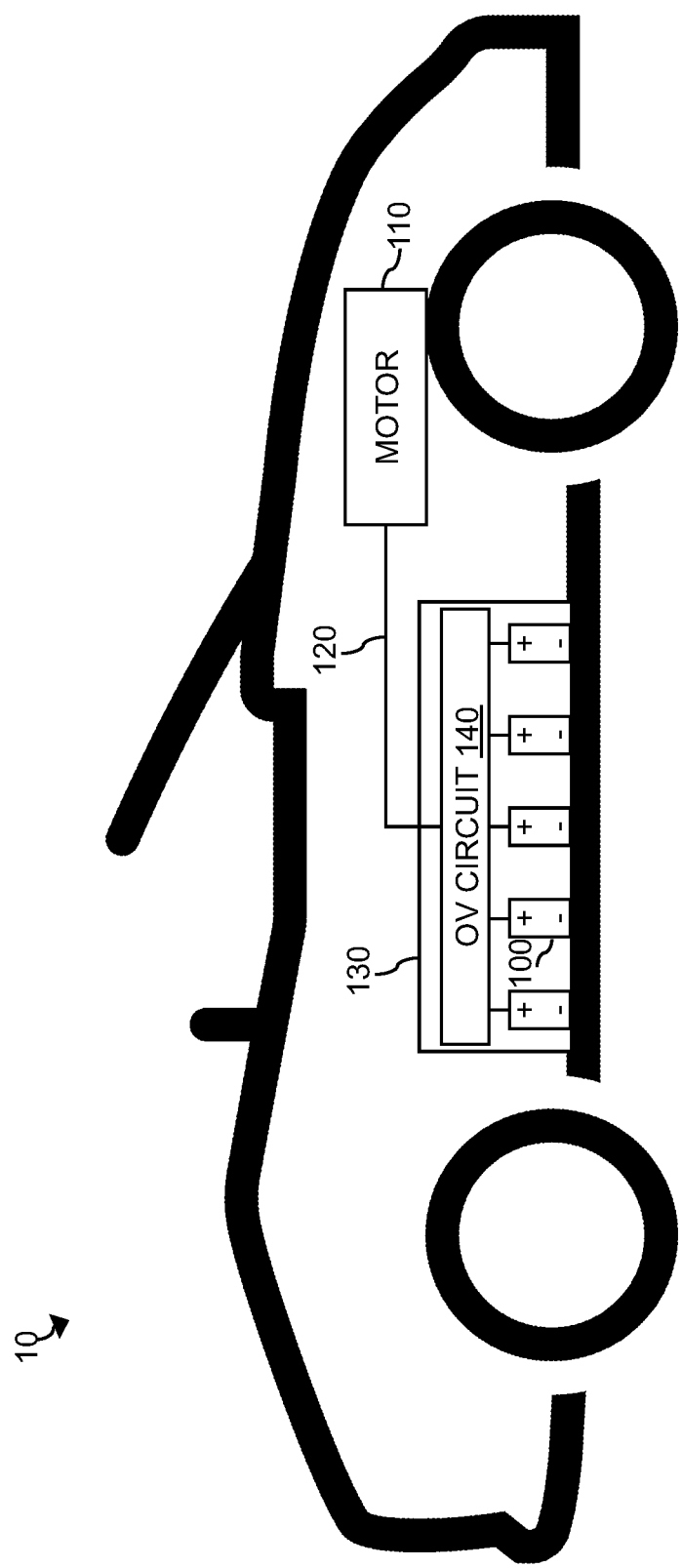
FIG. 2 is a side view of an electric vehicle according to another embodiment.

The over-voltage protection circuit 140 can be located in/on the housing 130, for example as illustrated in FIG. 2.

It is noted that although the over-voltage protection circuit 140 is illustrated conceptually in different locations in the block diagrams of FIGS. 1 and 2, the electrical components of the over-voltage protection circuit 140 can be distributed and/or located in different locations in the EV 10. For example, the over-voltage protection circuit 140 includes one or fuses, which can be located on or in the batteries 100, on or in the housing 130, and/or in another location.

Figure 3:
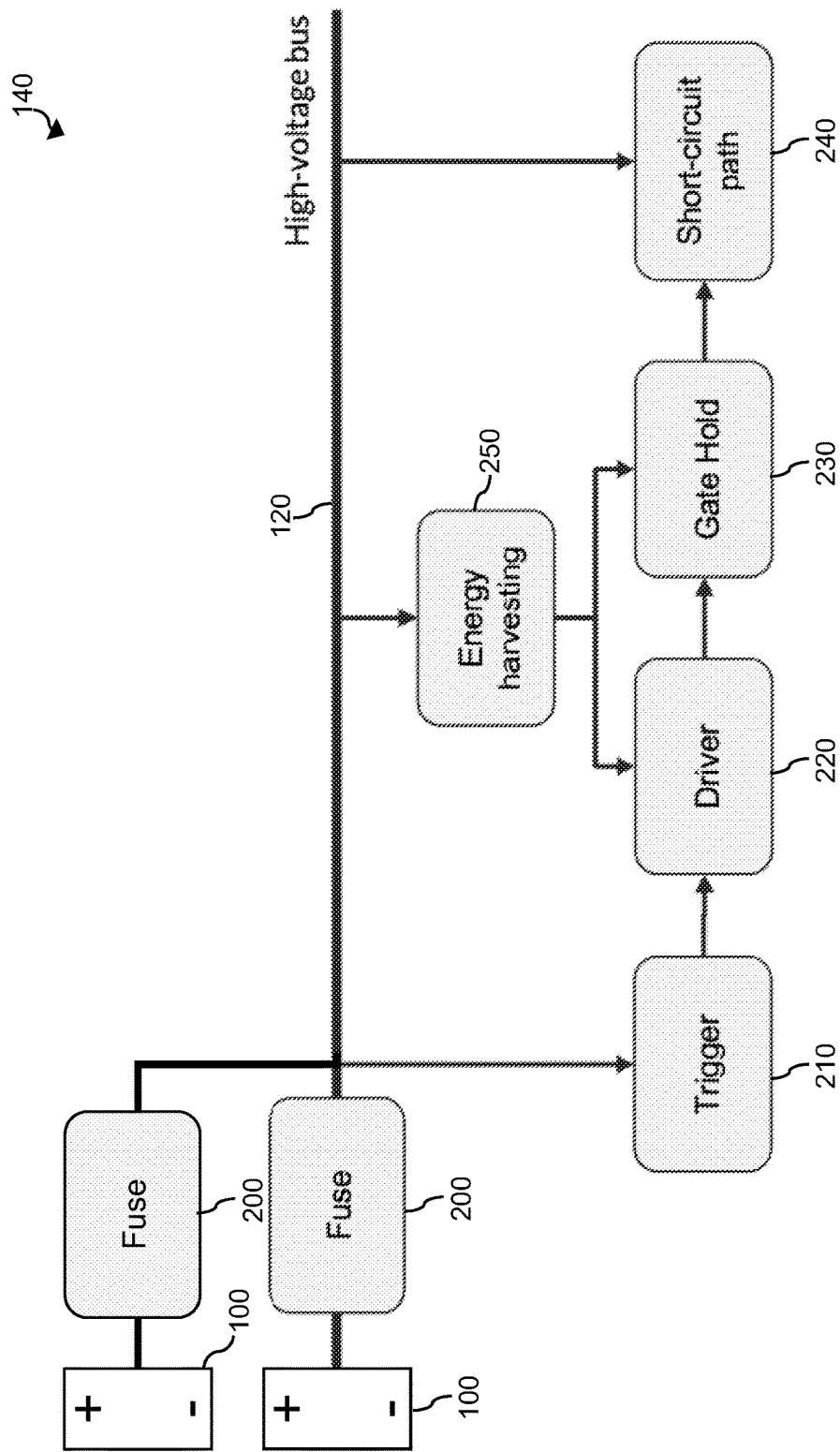
FIG. 3 is a block diagram of the over-voltage protection circuit illustrated in FIGS. 1 and 2 according to an embodiment.

FIG. 3 is a block diagram of the over-voltage protection circuit 140 according to an embodiment. The over-voltage protection circuit 140 includes a plurality of fuses 200, a trigger circuit 210, a driver circuit 220, a gate-hold circuit 230, a short-circuit path 240, and an energy-harvesting circuit 250. The over-voltage protection circuit 140 includes passive and active electrical components.

The trigger circuit 210 is electrically connected to the high-voltage bus 120 and to the output of the fuse(s) 200. The driver circuit 220 has an input (e.g., a driver-circuit input) that is electrically connected to an output (e.g., a trigger-circuit output) of the trigger circuit 210. The gate-hold circuit 230 has an input (e.g., a gate-hold circuit input) that is electrically connected to an output (e.g., a drive-circuit output) of the driver circuit 220. The short-circuit path 240 has a first input (e.g., a short-circuit-path input) that is electrically connected to an output (e.g., a gate-hold output) of the gate-hold circuit 230 and a second input that is electrically connected to the high-voltage bus 120. The energy-harvesting circuit 250 has one or more inputs (e.g., one or more energy-harvesting circuit inputs) that is/are electrically connected to the high-voltage bus 120. The output(s) (e.g., one or more energy-harvesting circuit outputs) of the energy-harvesting circuit 250 is/are electrically connected to respective inputs of the driver circuit 220 and the gate-hold circuit 230.

Each fuse 200 is electrically coupled to and/or connected to (e.g., in series with) a respective battery 100 or a respective group of batteries 100. In some embodiments, each fuse 200 can be located on or in a respective battery 100, on or in a respective group of batteries 100, on or in the housing 130 (FIGS. 1, 2), or in another location in the EV 10. Each fuse 200 is electrically connected in series with the high-voltage bus 120. In some embodiments, a respective fuse 200 is electrically connected in series with each high-voltage conductive line in the high-voltage bus 120 where each high-voltage conductive line is electrically connected and/or electrically coupled to a respective one or more batteries 100. For example, each high-voltage conductive line in the high-voltage bus 120 can be electrically connected to an individual battery 100 such that each fuse 200 is electrically coupled in series with a respective high-voltage conductive line and a respective battery 100.

Each fuse 200 is configured to conduct current through the respective high-voltage conductive line in the high-voltage bus 120 when the current passing through the respective fuse 200 is less than or equal to the current rating of the fuse 200. When the current passing through a fuse 200 is higher than the current rating, that fuse 200 is configured to interrupt current flow through the fuse 200 to electrically disconnect the motor 110 and other electrical components of the EV's powertrain from the respective battery(ies) 100. Each fuse 200 can have a current rating, for example, of about 40 A to about 60 A, including about 45 A, about 50 A, about 55 A, or another current.

The trigger circuit 210 includes one or more electrical components that is/are configured to activate when the voltage of the high-voltage bus 120 is higher than or equal to a threshold or trigger voltage. An example of an electrical component in trigger circuit 210 that can be activated when the voltage of the high-voltage bus 120 is higher than a threshold voltage is a Zener diode. In an alternative embodiment, the trigger circuit 210 that can be activated when the voltage of the high-voltage bus 120 is higher than a threshold voltage of a varistor. The voltage of the high-voltage bus 120 can increase above the threshold voltage when one or more batteries 100 become faulty.

When the voltage of the high-voltage bus 120 is lower than the threshold voltage, the trigger circuit 210 is in a non-conducting state. In the non-conducting state, current from the high-voltage bus 120 does not pass through the trigger circuit 210 (e.g., to the driver circuit 220). When the voltage of the high-voltage bus 120 is higher than the threshold voltage, the trigger circuit 210 transitions to a conducting state. In the conducting state, current from the high-voltage bus 120 can pass through the trigger circuit 210 (e.g., to the driver circuit 220).

In one example, the motor 110 (FIGS. 1, 2) and other electrical components of the powertrain are configured to operate with a maximum working voltage of about 400V. The threshold voltage of the trigger circuit 210 can be set, for example, in the range of 420V to 460V, including 420V, 430V, 440V, 450V, and/or any range or value between any two of the foregoing voltages. The voltage across the high-voltage bus 120 can range and/or oscillate between about 400V and about 650V in an overvoltage event/fault.

The driver circuit 220 includes one or more active electrical components (e.g., one or more transistors) that are powered, wholly or partially, by the output of the energy-harvesting circuit 250. The energy-harvesting circuit 250 includes one or more passive electrical components (e.g., resistors, capacitors, diodes, and/or inductors) that down-converts the voltage from the high-voltage bus 120 to one or more lower voltages that can be used as an input to the driver circuit 220 and gate-hold circuit 230 without damaging the electrical components of the driver circuit 220 and gate-hold circuit 230.

Current flowing through the driver circuit 220 (e.g., from trigger circuit 210) enables current to flow from the high-voltage bus 120 through the energy-harvesting circuit 250 to charge one or more energy-storage devices (e.g., capacitors) in the gate-hold circuit 230. The voltage across one or more of the energy-storages, when fully charged, is configured to be higher than a threshold voltage to activate one or more active components (e.g., a semiconductor-controlled rectifier (SCR), a MOSFET, an IGBT, and/or another power switch) in the short-circuit path 240. When the active component(s) in the short-circuit path 240 is/are activated, an effective short circuit or other low-resistance circuit is formed, which causes the current flowing through the high-voltage bus 120 to increase and become higher than the current rating of the fuse(s) 200. This high current activates the fuse(s) 200 to interrupt current flow therethrough and electrically disconnect the motor 110 and other electrical components of the EV's powertrain from the respective battery(ies) 100 (FIG. 1). Only the fuse(s) 200 that are electrically coupled to the faulty batteries 100 (e.g., that caused the voltage of the high-voltage bus 120 to increase above the threshold voltage) are blown to disable/decoupled the faulty batteries 100. For example the "good"/non-faulty batteries 100 can be disconnected from the high-voltage bus 120 due to other protections for the batteries 100, such as battery-level protection, that can be implemented before the over-voltage protection circuit 140 is activated so that only the fuse(s) 200 for the faulty batteries 100 is/are blown.

Figure 4:
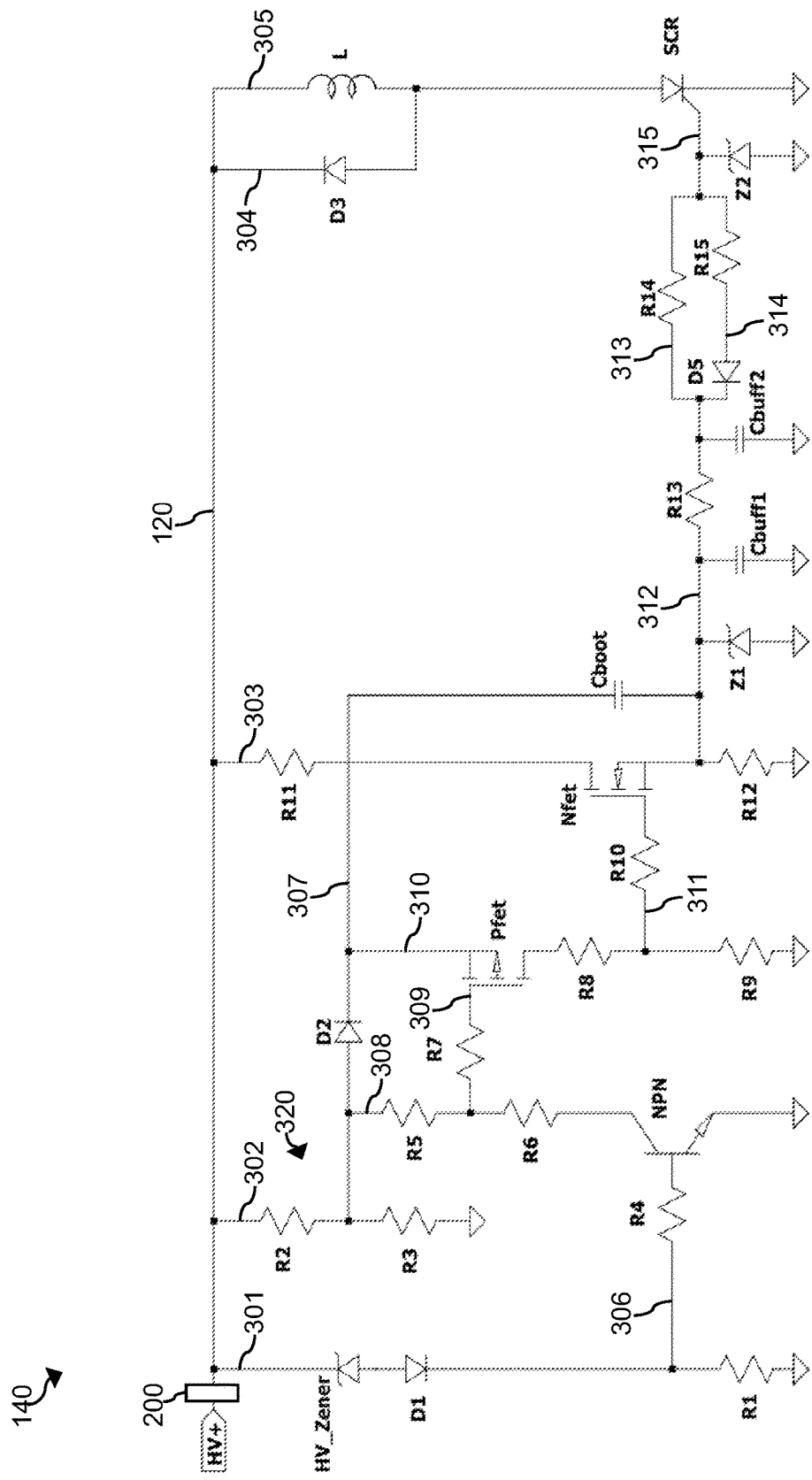
FIG. 4 is a schematic circuit diagram of the over-voltage protection circuit illustrated in FIGS. 1 and 2 according to an embodiment.

FIG. 4 is a schematic circuit diagram of the over-voltage protection circuit 140 according to an embodiment. A plurality of conductive lines 301-305 in the over-voltage protection circuit 140 are electrically connected to the high-voltage bus 120. A high-voltage (HV) Zener diode (labeled as HV_Zener), a diode D1, and a resistor R1 are electrically connected and/or electrically coupled in series with the first conductive line 301. The HV Zener diode is configured such that its cathode is located closer to the high-voltage bus 120 than its anode (e.g., the cathode is electrically connected to the high-voltage bus 120), such that the Zener diode does not conduct current from the high-voltage bus 120 until a threshold or breakdown voltage is applied across the Zener diode when the Zener diode is reverse biased. As such, the Zener diode is in a non-conducting state when the voltage across the Zener diode is lower than or equal to the threshold voltage and in a conducting state when the voltage across the Zener diode exceeds the threshold voltage. The Zener diode and the resistor R1 can function as the trigger circuit 210 (FIG. 3). The Zener diode is configured to have a threshold voltage that is equal to a trigger voltage of the high-voltage bus 120 such that the Zener diode transitions to the conducting state when the voltage across the high-voltage bus 120 is greater than or equal to the trigger voltage. The threshold voltage of the Zener diode is the same as the threshold voltage of the trigger circuit 210.

The diode D1 is located between the Zener diode and the resistor R1. The diode D1 is configured such that its anode is located closer to the Zener diode and to the high-voltage bus 120 than its cathode, such that the diode D1 does not conduct current towards the Zener diode, for example to prevent the Zener diode from becoming forward biased.

A first end of conductive line 306 is electrically connected to the first conductive line 301 between the diode D1 and the resistor R1. A second end of conductive line 306 is electrically connected to the base terminal of an NPN transistor.

Resistors R2 and R3 are electrically connected in series with the second conductive line 302. The resistors R2 and R3 are electrical components of the driver circuit 220 that reduce the voltage across the high-voltage bus 120 to a lower voltage that is suitable and/or safe to use with the electrical components of the over-voltage protection circuit 140 (e.g., to prevent damage thereto). The first and second conductive lines 301, 302 are electrically in parallel with each other.

A conductive line 307 is electrically connected to the voltage divider 320 in the second conductive line 302 between respective terminals of resistors R2 and R3. A conductive line 308 is electrically connected to conductive line 307. Resistors R5 and R6 and the NPN transistor are electrically connected in series with conductive line 308. Resistor R6 is located between resistor R5 and the collector terminal of the NPN transistor. The emitter terminal of the NPN transistor is electrically connected to ground.

A conductive line 309 is electrically connected to conductive line 308 between respective terminals of resistors R5 and R6. A resistor R7 and a gate terminal of a PFET (p-channel field-effect transistor (FET)) are electrically connected in series with conductive line 309.

A conductive line 310 is electrically connected to conductive lines 307 and 309. The PFET and resistors R8 and R9 are electrically connected in series with conductive line 310. The source terminal of the PFET is electrically connected to conductive line 310. The drain terminal of the PFET is electrically connected to resistor R8. One terminal of resistor R9 is electrically connected to ground.

A conductive line 311 is electrically connected to conductive line 310 between respective terminals of resistors R8 and R9. A resistor R10 and a gate terminal of an NFET (n-channel FET) are electrically connected in series with conductive line 311.

Resistors R11 and R12 and the NFET are electrically connected in series with the third conductive line 303. The NFET is located between the resistors R11 and R12. The drain terminal of the NFET is electrically connected to a terminal of resistor R11. The source terminal of the NFET is electrically connected to resistor R12.

A diode D2 and a capacitor Cboot are electrically connected in series with conductive line 307. The diode D2 is electrically connected to conductive line 307 between the electrical connections of conductive line 307 with conductive lines 308 and 310. The anode of the diode D2 is electrically connected to conductive lines 308 and 302. The cathode of the diode D2 is electrically connected to conductive line 310. Thus, the cathode of the diode D2 is located closer to conductive line 310 than the anode of the diode D2. A first terminal of capacitor Cboot is electrically connected to the cathode of diode D2.

Conductive line 312 is electrically connected to the third conductive line 303 between resistor R12 and the source terminal of the NFET. A second terminal of capacitor Cboot is electrically connected to conductive line 312. A resistor R13 is electrically connected in series with conductive line 312. A first buffer capacitor Cbuff1 is electrically connected to a first terminal of resistor R13. A second buffer capacitor Cbuff2 is electrically connected to a second terminal of resistor R13. A Zener diode Z1 is electrically connected to conductive line 312 between the electrical connections of conductive line 307 and the first buffer capacitor Cbuff1. In some embodiments, only one buffer capacitor is electrically connected to conductive line 312. The anode of Zener diode Z1 is electrically connected to ground. The cathode of Zener diode Z1 is electrically connected to conductive line 312.

Conductive lines 313 and 314 are electrically connected to conductive lines 312 and 315. Conductive lines 313 and 314 are electrically connected in parallel to each other. A resistor R14 is electrically connected in series with conductive line 313. A resistor R15 and a diode D5 are electrically connected in series with conductive line 314. Diode D5 is located between resistor R15 and conductive line 312. The anode of diode D5 is electrically connected to a terminal of resistor R15. The cathode of diode D5 is electrically connected to conductive lines 312 and 313.

Conductive line 315 is electrically connected to the gate terminal of a silicon-controlled rectifier (SCR). A Zener diode Z2 is electrically connected to conductive line 315. The anode of Zener diode Z2 is electrically connected to ground. The cathode of Zener diode Z1 is electrically connected to conductive line 315.

The SCR and an inductor L are electrically connected in series to the fifth conductive line 305. The anode of the SCR is electrically connected to a first terminal of the inductor L. The cathode of the SCR is electrically connected to ground. A second terminal of the inductor L is electrically connected to the high-voltage bus 120.

The fourth conductive line 304 is electrically connected to the high-voltage bus 120 and the fifth conductive line 305. A diode D3 is electrically connected in series with conductive line 304. The anode of diode D3 is electrically connected to conductive line 305. The cathode of diode D3 is electrically connected to the high-voltage bus 120.

Figure 5:
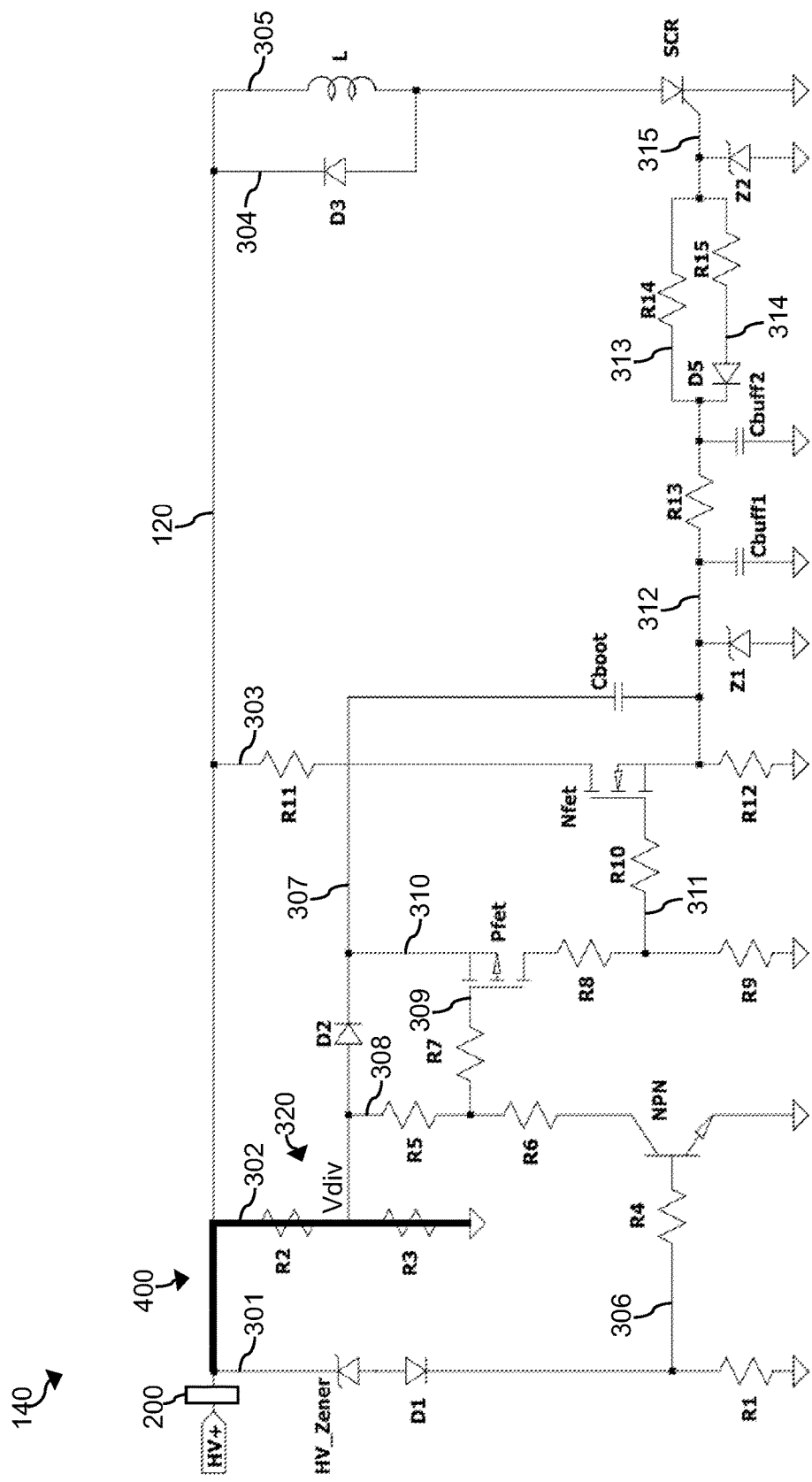
FIG. 5 illustrates a first current path in the over-voltage protection circuit when the voltage across the high-voltage bus is lower than the threshold voltage of the HV Zener diode.

In operation, when the voltage across the high-voltage bus 120 is lower than the threshold voltage of the HV Zener diode, the HV Zener diode is in a non-conducting state. When the HV Zener diode is in a non-conducting state, current flows through resistors R2 and R3 (e.g., voltage divider 320) in current path 400, as illustrated in FIG. 5. The voltage Vdiv produced by the voltage divider 320 and the associated current is used as an energy source that enables the operation of the over-voltage protection circuit 140 when the voltage across the high-voltage bus 120 is higher than or equal to the threshold voltage of the HV Zener diode. The voltage divider 320 can function as a portion of the energy-harvesting circuit 250 (FIG. 3). The current path 400 only through resistors R2 and R3 in FIG. 5 can represent the steady-state current flow.

Figure 6:
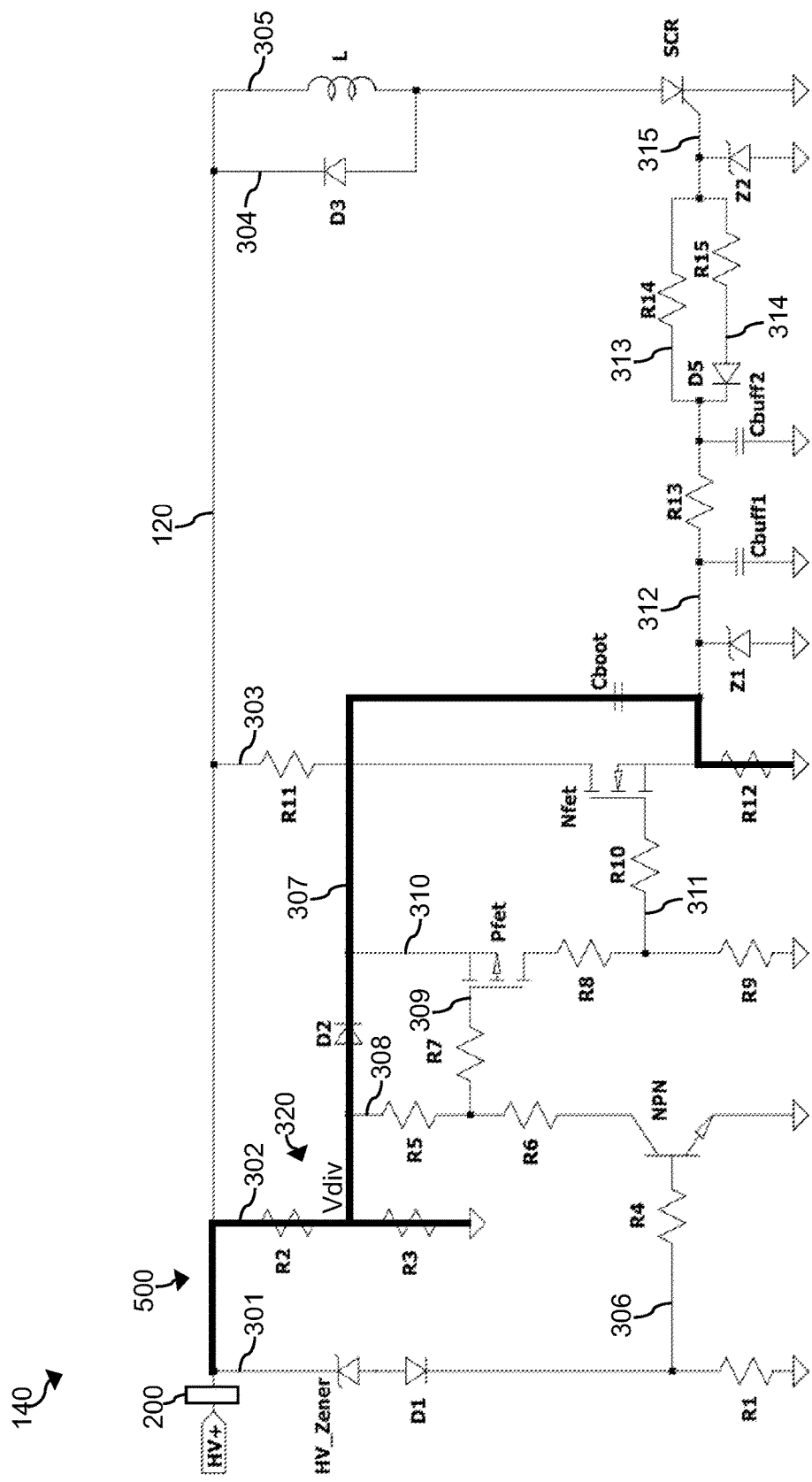
FIG. 6 illustrates a second current path in the over-voltage protection circuit when the voltage across the high-voltage bus is lower than the threshold voltage of the HV Zener diode.

In some embodiments, for example during startup, the current can flow through diode D2, capacitor Cboot, and resistor R12, in addition to through resistors R2 and R3, in current path 500 as illustrated in FIG. 6. After the capacitor Cboot is charged and/or in response to a drop in the voltage across the high-voltage bus 120, the current can return to the current path 400 illustrated in FIG. 5.

Figure 7:
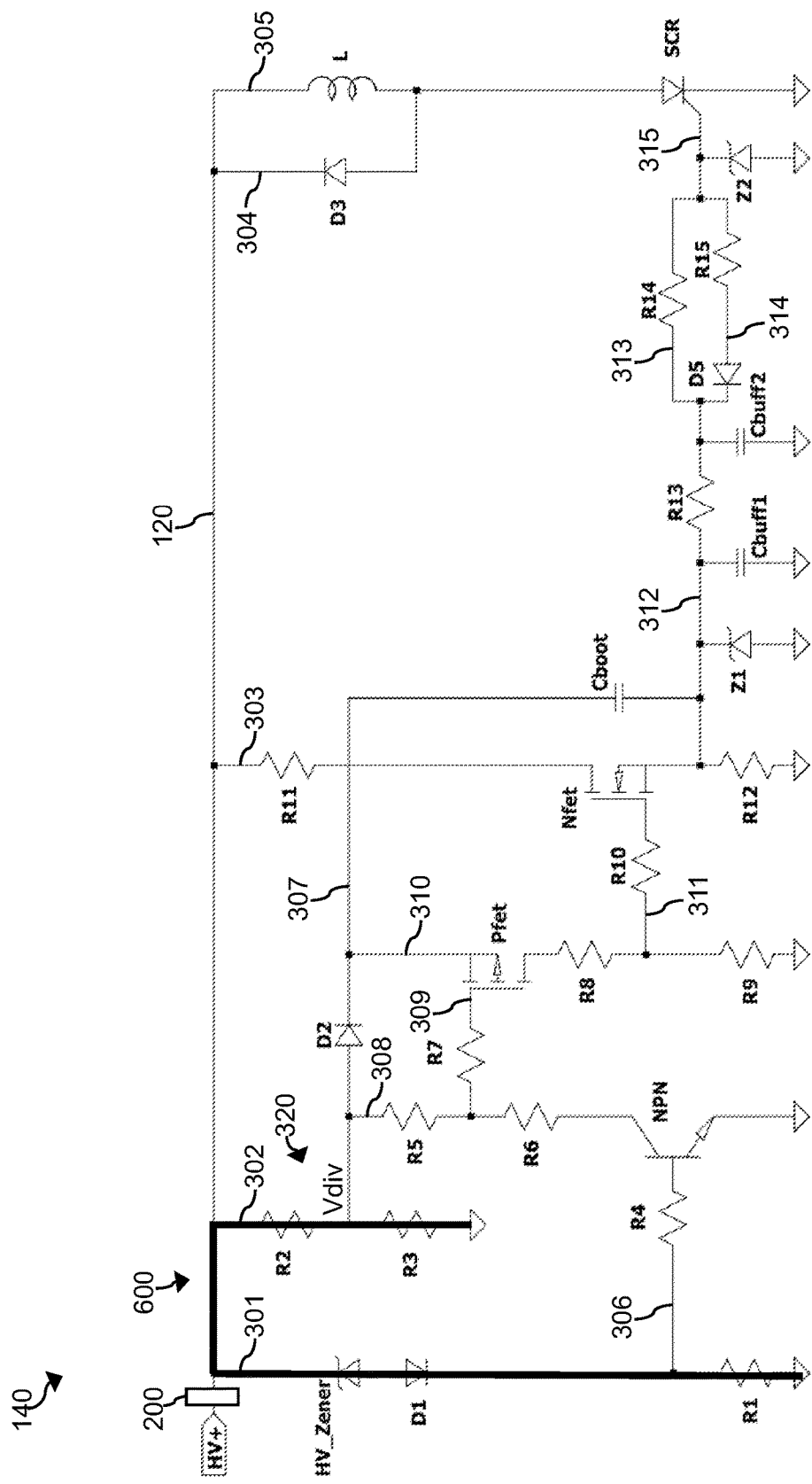
FIG. 7 illustrates the current path in a first over-voltage protection state of the over-voltage protection circuit.

FIG. 7 illustrates the current path 600 in a first over-voltage protection state of the over-voltage protection circuit 140 when the voltage across the high-voltage bus 120 is higher than or equal to the threshold voltage of the HV Zener diode. In this state, the high voltage across the high-voltage bus 120 causes the HV Zener diode to become reverse biased and transition to a conducting state to allow the current to flow through the HV Zener diode, diode D1, and resistor R1 to ground. The current continues to flow through resistors R2 and R3.

Figure 8:
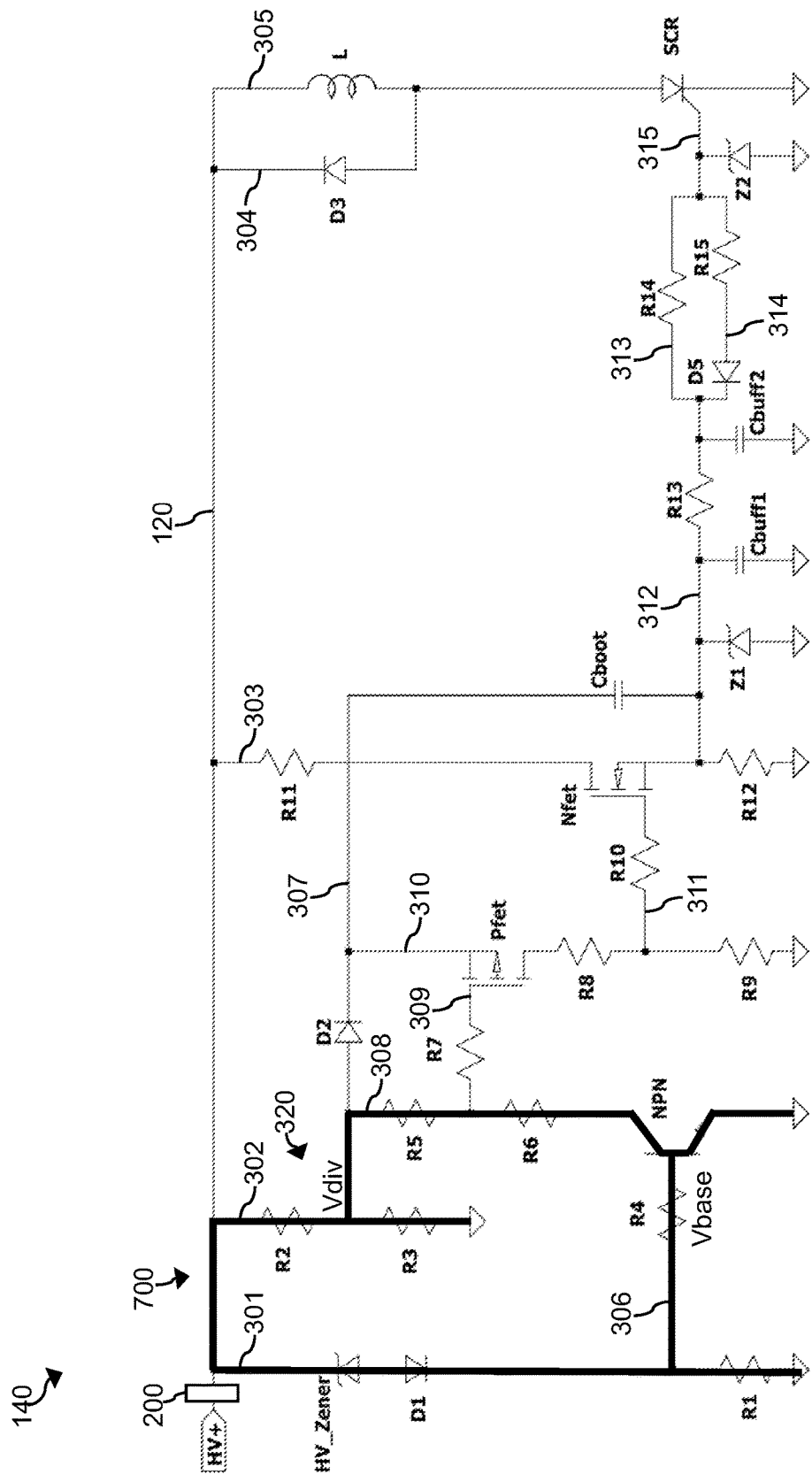
FIG. 8 illustrates the current path in a second over-voltage protection state of the over-voltage protection circuit.

FIG. 8 illustrates the current path 700 in a second over-voltage protection state of the over-voltage protection circuit 140 when the voltage across the high-voltage bus 120 is higher than or equal to the threshold voltage of the HV Zener diode. The second over-voltage protection state occurs after the first over-voltage protection state.

In the second over-voltage protection state, current flows through the resistor R4, the NPN transistor, and the resistors R4 and R5. The NPN transistor transitions to the "on" or conducting state due to the base current (current flowing through resistor R4). The voltage built across resistor R1 allows current to flow through resistor R4. For the NPN transistor to turn on, the voltage at the base terminal of the NPN transistor needs to be greater than the forward voltage VBE for the NPN transistor. The resistance of resistor R4 is selected to produce a voltage Vbase at the base terminal of the NPN transistor that is greater than the VBE for the NPN transistor.

The current continues to flow through resistors R2 and R3 and through the electrical components in the second over-voltage protection state.

Figure 9:
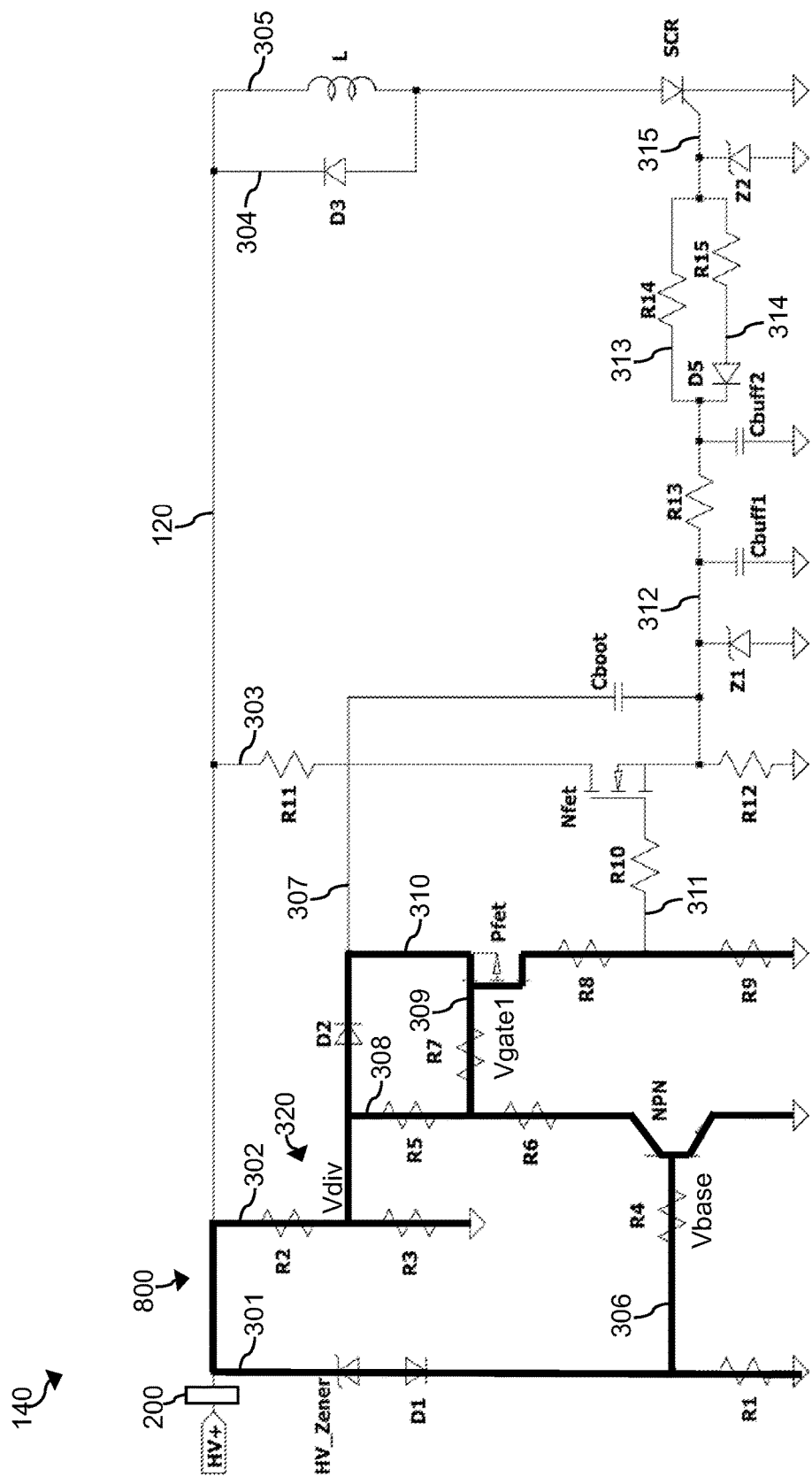
FIG. 9 illustrates the current path in a third over-voltage protection state of the over-voltage protection circuit.

FIG. 9 illustrates the current path 800 in a third over-voltage protection state of the over-voltage protection circuit 140 when the voltage across the high-voltage bus 120 is higher than or equal to the threshold voltage of the HV Zener diode. The third over-voltage protection state occurs after the second over-voltage protection state.

In the third over-voltage protection state, the current flows through diode D2, resistors R7-R9, and the PFET. The PFET transitions to the "on" or conducting state due to the voltage Vgate1 across the gate and source terminals of the PFET as current flows through the resistors R5 and R6. The current continues to flow through resistors R2 and R3 and through the electrical components in the first and second over-voltage protection states. The resistor R7 can limit the gate current of the PFET.

Figure 10:
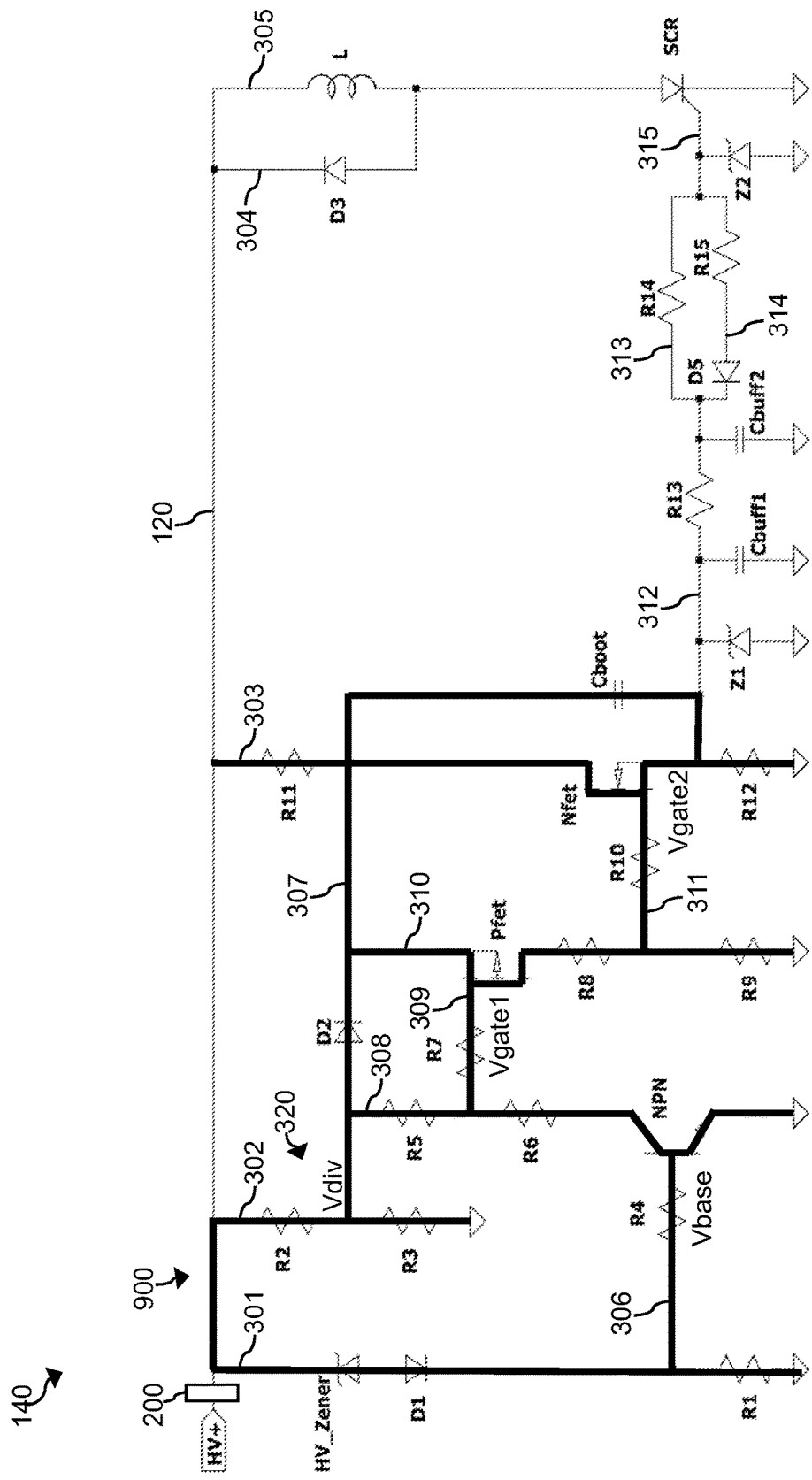
FIG. 10 illustrates the current path in a fourth over-voltage protection state of the over-voltage protection circuit.

FIG. 10 illustrates the current path 900 in a fourth over-voltage protection state of the over-voltage protection circuit 140 when the voltage across the high-voltage bus 120 is higher than or equal to the threshold voltage of the HV Zener diode. The fourth over-voltage protection state occurs after the third over-voltage protection state.

In the fourth over-voltage protection state, the current flows through resistors R10-R12, the NFET, and the capacitor Cboot. The NFET transitions to the "on" or conducting state due to the voltage Vgate2 across the gate and source terminals of the NFET as current flows through the resistors R8 and R9. The current continues to flow through resistors R2 and R3 and through the electrical components in the first, second, and third over-voltage protection states. The resistor R10 can limit the gate current of the NFET.

In the second, third, and fourth over-voltage protection states, the electrical components of the energy-harvesting circuit 250 (FIG. 3) and the driver circuit 220 (FIG. 3) are in use. The electrical components corresponding to the energy-harvesting circuit 250 can include the resistors R2, R3, and R11 and the diode D2. The electrical components corresponding to the driver circuit 220 can include the resistors R4-R10 and R12, the NPN transistor, the PFET, and the NFET. The capacitor Cboot stores energy in the energy-harvesting circuit 250 and allows the driver circuit 220 to operate efficiently.

Figure 11:
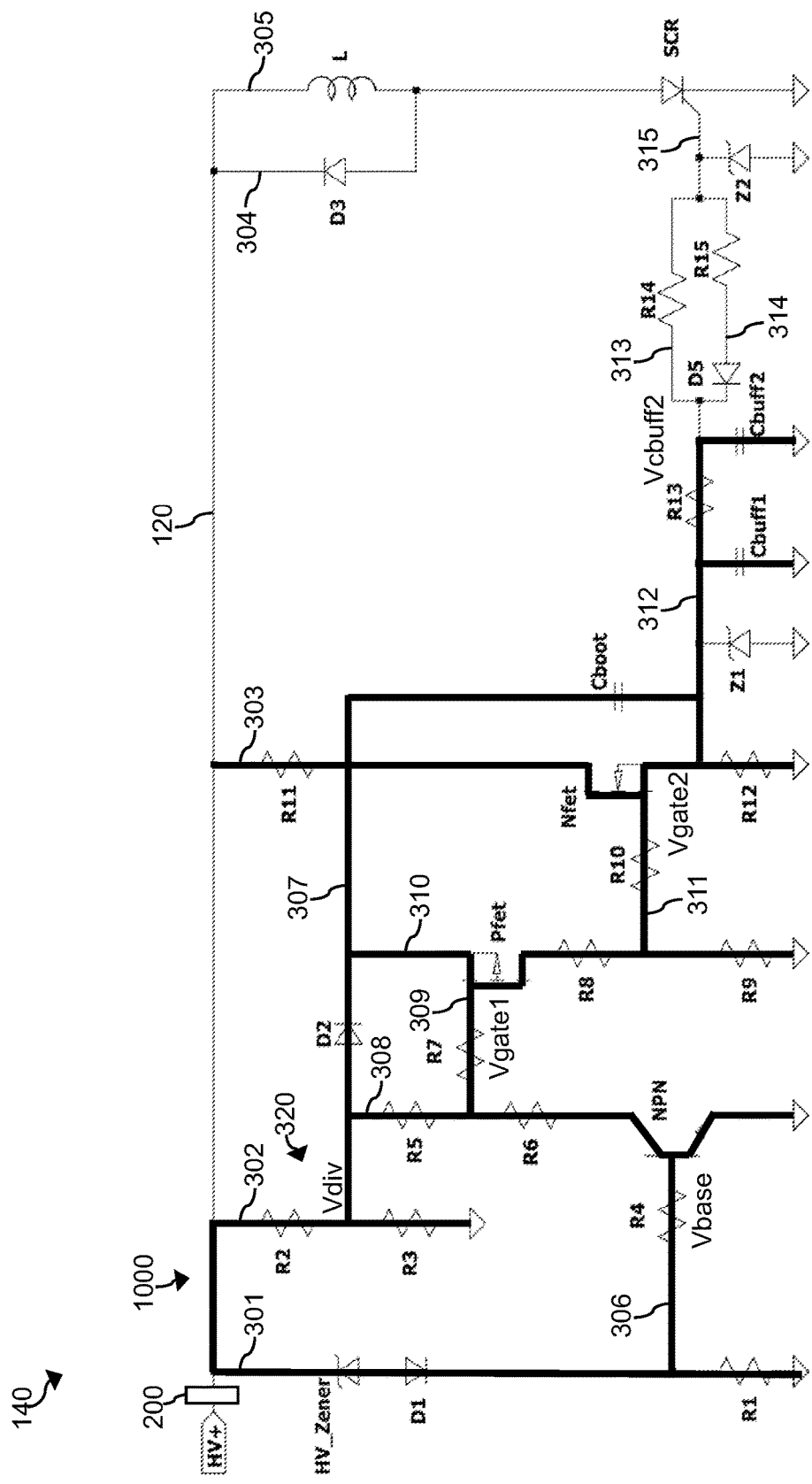
FIG. 11 illustrates the current path in a fifth over-voltage protection state of the over-voltage protection circuit.

FIG. 11 illustrates the current path 1000 in a fifth over-voltage protection state of the over-voltage protection circuit 140 when the voltage across the high-voltage bus 120 is higher than or equal to the threshold voltage of the HV Zener diode. The fifth over-voltage protection state occurs after the fourth over-voltage protection state.

In the fifth over-voltage protection state, the current flows through buffer capacitors Cbuff1 and Cbuff2 and resistor R13. The current is limited by resistors R11, R12, and R13. In some embodiments, the circuit only include one buffer capacitor. A voltage (Vcbuff2) is formed across buffer capacitor Cbuff2. When the buffer capacitor Cbuff2 is fully charged, the gate voltage at the SCR (e.g., the voltage at conductive line 315) is configured to be higher than the threshold voltage of the SCR. The current continues to flow through resistors R2 and R3 and through the electrical components in the first, second, third, and fourth over-voltage protection states.

In the fifth over-voltage protection state, the electrical components of the gate-hold circuit 230 (FIG. 3) are in use (e.g., in addition to the electrical components used In the second, third, and fourth over-voltage protection states). The electrical components corresponding to the gate-hold circuit 230 can include the buffer capacitors Cbuff1 and Cbuff2 and the resistor R13. Optional Zener diode(s) Z1 and/or Z2 can be included in the gate-hold circuit 230 as a safety feature.

Figure 12:
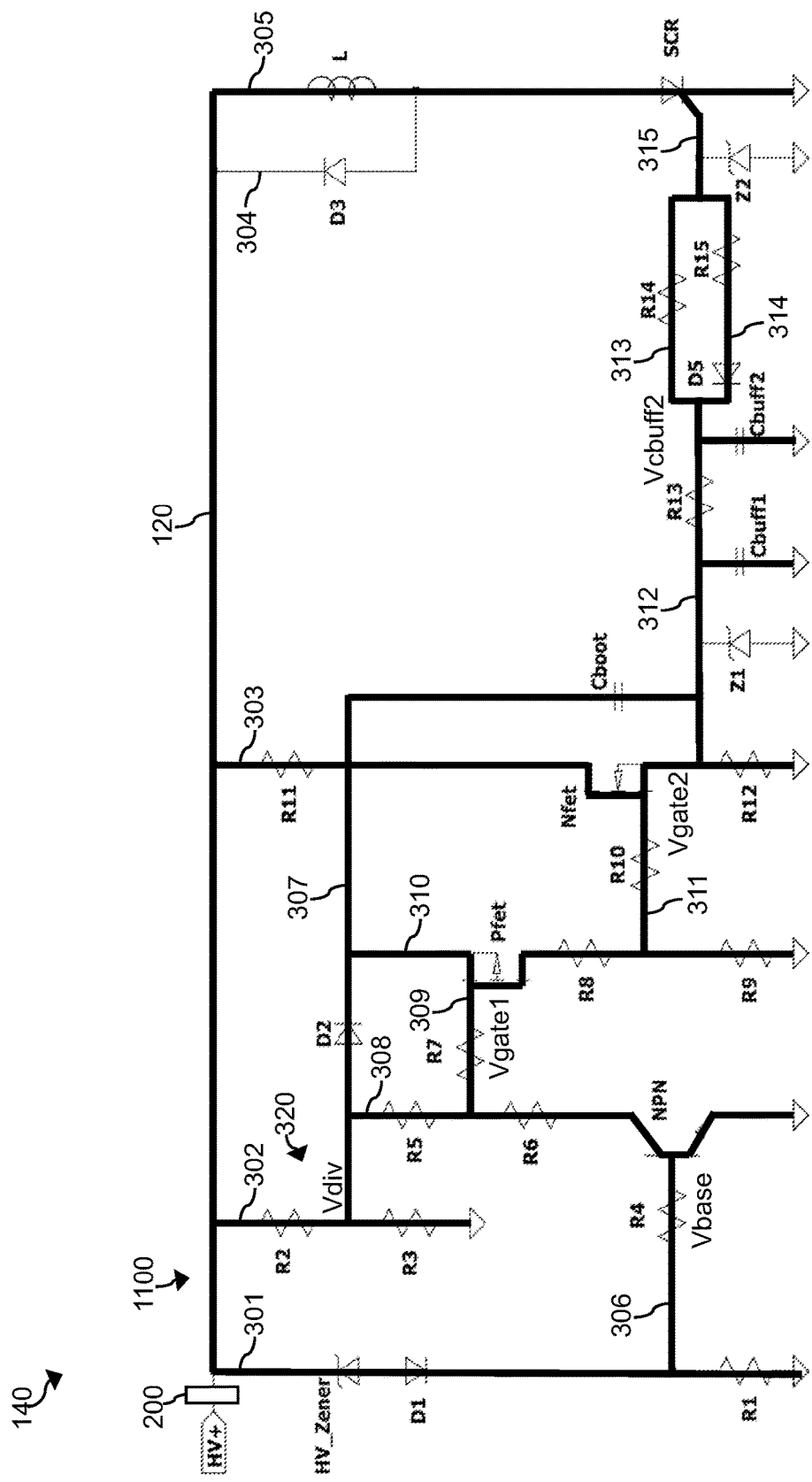
FIG. 12 illustrates the current path in a sixth over-voltage protection state of the over-voltage protection circuit.

FIG. 12 illustrates the current path 1100 in a sixth over-voltage protection state of the over-voltage protection circuit 140 when the voltage across the high-voltage bus 120 is higher than or equal to the threshold voltage of the HV Zener diode. The sixth over-voltage protection state occurs after the fifth over-voltage protection state.

In the sixth over-voltage protection state, the current flows through the SCR and inductor L. As a result of the voltage Vcbuff2 across buffer capacitor Cbuff2, the voltage across the gate terminal of the SCR is higher than the threshold voltage of the SCR, which causes the SCR to transition from an "off" or non-conducting state to an "on" or conducting state. When the SCR transitions to the conducting state, a low-resistance path through the fifth conductive line 305 is provided for the current flowing through the high-voltage bus 120.

In the sixth over-voltage protection state, the electrical components of the short-circuit path 240 (FIG. 3) are in use (e.g., in addition to the electrical components used in the second, third, fourth, and fifth over-voltage protection states). The electrical components corresponding to the short-circuit path 240 can include the SCR and the inductor L. The inductor L can be optional in some embodiments. An optional diode D3 can be electrically connected in parallel with the inductor L (in conductive line 304) to clamp the voltage across the inductor L3 to a positive voltage. A negative voltage across the inductor L would automatically turn off the SCR, which is undesirable.

Figure 13:
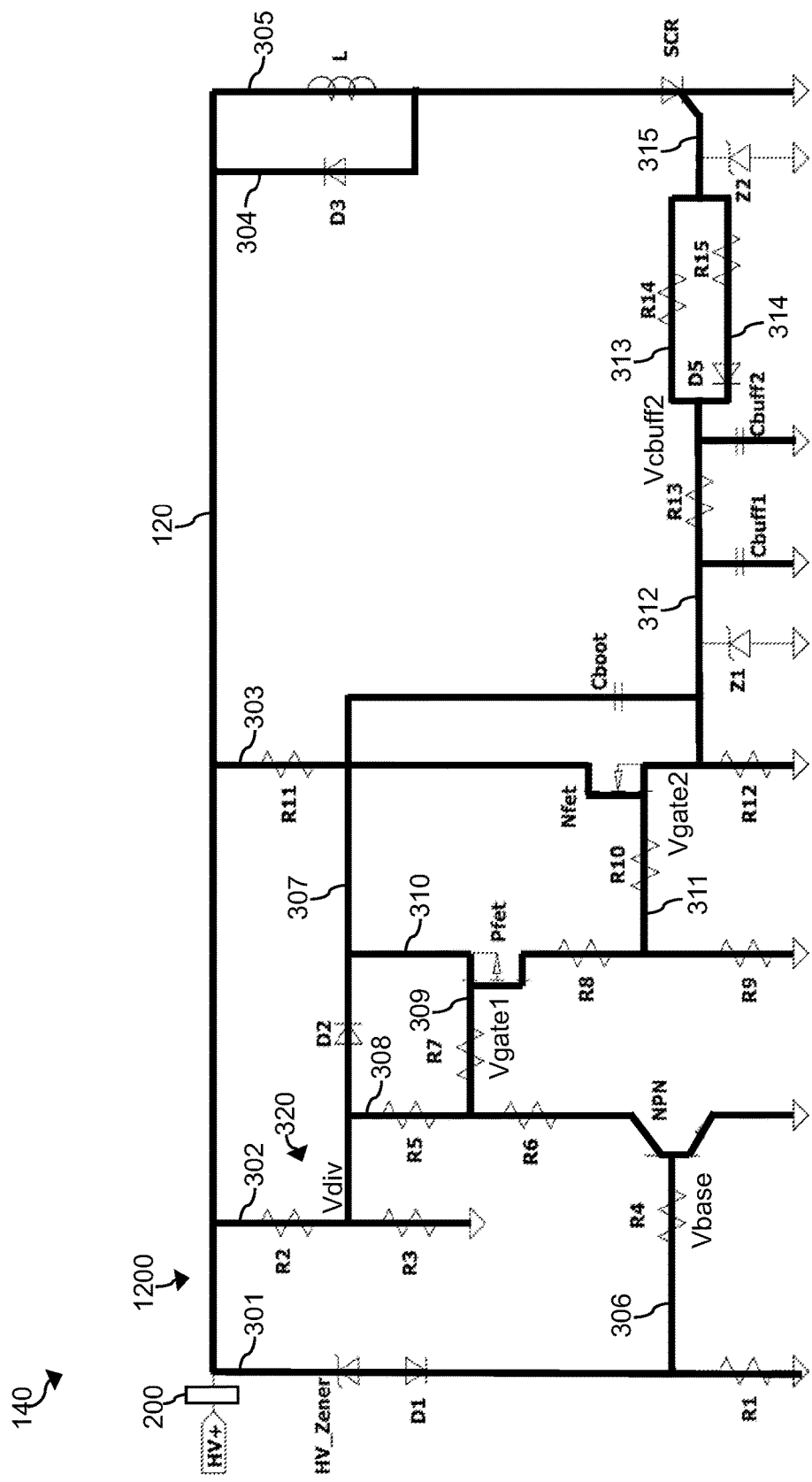
FIG. 13 illustrates the current path in a seventh over-voltage protection state of the over-voltage protection circuit.

FIG. 13 illustrates the current path 1200 in a seventh over-voltage protection state of the over-voltage protection circuit 140 when the voltage across the high-voltage bus 120 is higher than or equal to the threshold voltage of the HV Zener diode. Current path 1200 is the same as current path 1100 except that in current path 1200 the current flows through diode D3 in conductive line 304. Current path 1200 would occur during the dissipation of the energy stored in the inductor L. The diode D3 prevents the SCR from turning off due to the presence of a negative voltage between the inductor L terminals.

Figure 14:
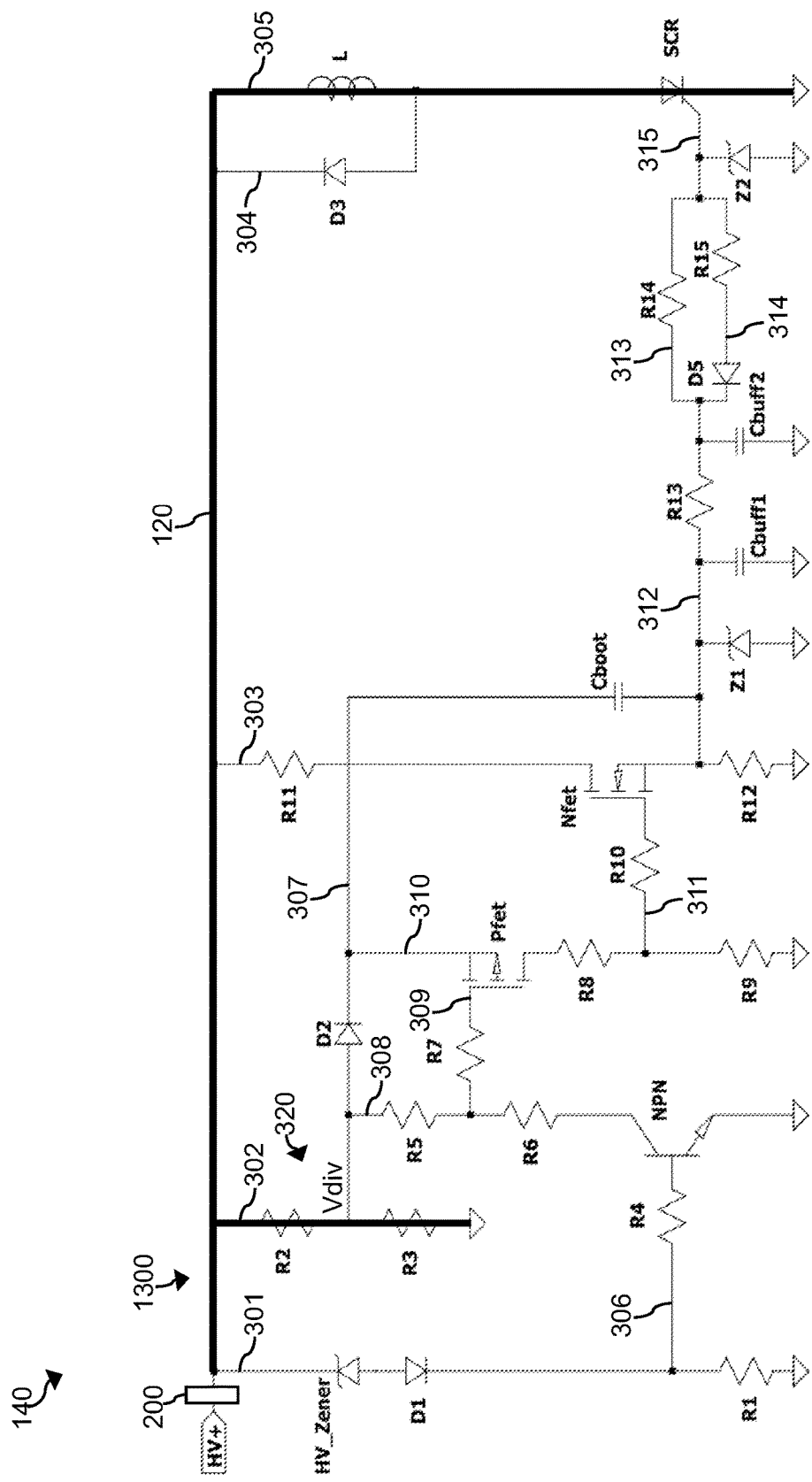
FIG. 14 illustrates the current path in an eighth over-voltage protection state of the over-voltage protection circuit.

FIG. 14 illustrates the current path 1300 in an eighth over-voltage protection state of the over-voltage protection circuit 140 when the voltage across the high-voltage bus 120 is higher than or equal to the threshold voltage of the HV Zener diode. The over-voltage protection circuit 140 is configured such that the current path through the fifth conductive line 305, including the inductor L and the SCR (when the SCR is in the conducting state), is the path of least resistance for the current flowing through the high-voltage bus 120. Therefore, all or substantially all current from the high-voltage bus 120 flows through the fifth conductive line 305 in an effective short-circuit path. A small amount of current may continue to flow through resistors R2 and R3 until the voltage across the high-voltage line 120 is equal to ground voltage. The optional inductor L can reduce the rate (e.g., dI/dt) at which the flow of current increases through the fifth conductive line 305 to soften the effective short-circuit transient response, which can allow optimization of the SCR.

The low-resistance path of the fifth conductive line 305 causes the current flowing through the high-voltage bus 120 to increase. In one example, the current can increase to about 200 A (e.g., from about 20 A-40 A). The resistance of the fifth conductive line 305 is configured to cause the current flowing through the high-voltage bus 120 to become higher than the current rating of the fuse(s) 200, such as about 50 A in an embodiment, which causes the fuse(s) 200 to blow and interrupt current flow the fuse(s) 200 and the high-voltage conductive line 120. When the current flow is interrupted through the fuse(s) 200 and the high-voltage conductive line 120, the motor 110 (FIG. 1) and other electrical components of the EV's powertrain are electrically disconnected from the respective battery(ies) 100 (FIG. 1).

In the eighth over-voltage protection state, the electrical components of the short-circuit path 240 (FIG. 3) are in use (e.g., in addition to at least some of the electrical components of the energy-harvesting circuit 250 (FIG. 3).

The invention should not be considered limited to the particular embodiments described above, but rather should be understood to cover all aspects of the invention as fairly set out in the attached claims. Various modifications, equivalent processes, as well as numerous structures to which the invention may be applicable, will be apparent to those skilled in the art to which the invention is directed upon review of this disclosure. The claims are intended to cover such modifications and equivalents.

Also, as described, some aspects may be embodied as one or more methods. The acts performed as part of the method may be ordered in any suitable way. Accordingly, embodiments may be constructed in which acts are performed in an order different than illustrated, which may include performing some acts simultaneously, even though shown as sequential acts in illustrative embodiments.

What is claimed is:

1. An over-voltage protection circuit comprising:
   a fuse having a first terminal electrically connected to one or more batteries and a second terminal electrically connected to a high-voltage bus to power a motor;
   a trigger circuit electrically connected to the high-voltage bus, the trigger circuit having a conducting state when a voltage of the high-voltage bus is higher than a threshold voltage and a non-conducting state when a voltage of the high-voltage bus is lower than the threshold voltage;
an energy-harvesting circuit electrically connected to the high-voltage bus;
a driver circuit electrically connected to an output of the trigger circuit and an output of the energy-harvesting circuit;
a gate-hold circuit electrically connected to an output of the driver circuit and the output of the energy-harvesting circuit; and
a short-circuit path electrically connected to an output of the gate-hold circuit, the short-circuit path having a first state in which the short-circuit path is electrically disconnected from the high-voltage bus and a second state in which the short-circuit path is electrically connected to the high-voltage bus,
wherein when the trigger circuit is in the conducting state, one or more transistors in the driver circuit is/are activated to charge a buffer capacitor in the gate-hold circuit, the buffer capacitor producing a buffer-capacitor voltage that is higher than a threshold voltage of the short-circuit path to thereby transition the short-circuit path from the first state to the second state, the short-circuit path in the second state causing a current through the high-voltage bus to increase above a current rating of the fuse to electrically disconnect the one or more batteries from the high-voltage bus.

2. The over-voltage protection circuit of claim 1, wherein the trigger circuit includes a Zener diode having a cathode electrically connected to the high-voltage bus and an anode electrically connected to the driver circuit, the Zener diode configured to transition from the non-conducting state to the conducting state at the threshold voltage such that a current flows through a reverse-biased Zener diode.

3. The over-voltage protection circuit of claim 2, wherein the Zener diode is electrically connected in series with a first conductive line, the first conductive line electrically connected to the high-voltage bus.

4. The over-voltage protection circuit of claim 3, wherein the driver circuit includes an NPN transistor having a base terminal electrically connected in series with a second conductive line, the second conductive line electrically connected to the first conductive line.

5. The over-voltage protection circuit of claim 4, wherein:
the Zener diode is electrically connected in series with a first resistor, and
a second resistor is electrically connected in series with the second conductive line.

6. The over-voltage protection circuit of claim 5, wherein:
the driver circuit further comprises a third conductive line electrically connected to a collector terminal of the NPN transistor, and
third and fourth resistors are electrically connected in series with the third conductive line.

7. The over-voltage protection circuit of claim 6, wherein the energy-harvesting circuit includes a voltage divider and the third conductive line is electrically coupled to an output of the voltage divider.

8. The over-voltage protection circuit of claim 7, wherein a fourth conductive line is electrically connected to the third conductive line between respective terminals of the third and fourth resistors, the fourth conductive line electrically connected to a gate terminal of a p-channel field-effect transistor (PFET).

9. The over-voltage protection circuit of claim 8, further comprising a fifth resistor electrically connected in series with the fourth conductive line, the current producing a gate-to-source voltage across the fourth resistor that is configured to transition the PFET from a non-conducting state to a conducting state.

10. The over-voltage protection circuit of claim 9, further comprising:
a fifth conductive line electrically connected to a drain terminal of the PFET; and
a sixth conductive line electrically connected to a gate terminal of an n-channel field-effect transistor (NFET), the sixth conductive line electrically connected to the fifth conductive line.

11. The over-voltage protection circuit of claim 10, further comprising:
a sixth resistor electrically connected in series with the fifth conductive line between the drain terminal of the PFET and the sixth conductive line;
a seventh resistor connected in series with the fifth conductive line between the sixth conductive line and ground; and
an eighth resistor electrically connected in series with the sixth conductive line between the gate terminal of the NFET and the fifth conductive line, wherein the current produces a gate voltage across the seventh resistor that is configured to transition the NFET from a non-conducting state to a conducting state.

12. The over-voltage protection circuit of claim 11, further comprising:
a seventh conductive line electrically connected to the high-voltage bus and a drain terminal of the NFET; and
a ninth resistor electrically connected in series with the seventh conductive line.

13. The over-voltage protection circuit of claim 12, further comprising:
an eighth conductive line electrically connected to the output of the voltage divider; and
a capacitor electrically connected in series with the eighth conductive line.

14. The over-voltage protection circuit of claim 13, further comprising:
a ninth conductive line electrically connected to the eighth conductive line and to a source terminal of the NFET; and
a buffer capacitor electrically connected to the ninth conductive line.

15. The over-voltage protection circuit of claim 14, wherein:
the buffer capacitor is a first buffer capacitor,
a second capacitor is electrically connected to the ninth conductive line, and
a tenth resistor is electrically connected in series with the ninth conductive line, the tenth resistor between the first and second buffer capacitors.

16. The over-voltage protection circuit of claim 15, further comprising:
a tenth conductive line electrically connected to the ninth conductive line;
an eleventh resistor electrically connected in series with the tenth conductive line;
an eleventh conductive line electrically connected to the ninth conductive line, the tenth and eleventh conductive lines in parallel electrically with each other;
a twelfth resistor electrically connected in series with the eleventh conductive line; and a twelfth conductive line electrically connected to the tenth and eleventh conductive lines and to the short-circuit path.

17. The over-voltage protection circuit of claim 16, further comprising a diode electrically connected in series with the eleventh conductive line, wherein an anode of the diode is electrically connected to the twelfth resistor.

18. The over-voltage protection circuit of claim 17, wherein:
the short-circuit path includes a silicon-controlled rectifier (SCR), the SCR having a gate terminal electrically connected to the twelfth conductive line, and
the current produces a voltage at the twelfth conductive line that is configured to transition the SCR from a non-conducting state to a conducting state.

19. The over-voltage protection circuit of claim 18, wherein:
a cathode of the SCR is electrically connected to ground, and
an anode of the SCR is electrically connected to a thirteenth conductive line, the thirteenth conductive line electrically connected to the high-voltage bus.

20. The over-voltage protection circuit of claim 19, wherein:
the diode is a first diode, and
the circuit further comprises:
an inductor electrically connected in series with the thirteenth conductive line; and
a second diode electrically connected in parallel with the inductor, the second diode having an anode electrically connected to the thirteenth conductive line and a cathode electrically connected to the high-voltage bus.

21. An over-voltage protection circuit comprising:
a plurality of fuses, each fuse having a respective first terminal electrically connected to a respective battery and a second terminal electrically connected to a high-voltage bus to power a motor;
a trigger circuit electrically connected to the high-voltage bus, the trigger circuit having a conducting state when a voltage of the high-voltage bus is higher than a threshold voltage and a non-conducting state when a voltage of the high-voltage bus is lower than the threshold voltage;
an energy-harvesting circuit electrically connected to the high-voltage bus;
a driver circuit electrically connected to an output of the trigger circuit and an output of the energy-harvesting circuit;
a gate-hold circuit electrically connected to an output of the driver circuit and the output of the energy-harvesting circuit; and
a short-circuit path electrically connected to an output of the gate-hold circuit, the short-circuit path having a first state in which the short-circuit path is electrically disconnected from the high-voltage bus and a second state in which the short-circuit path is electrically connected to the high-voltage bus,
wherein when the trigger circuit is in the conducting state, one or more transistors in the driver circuit is/are activated to charge a buffer capacitor in the gate-hold circuit, the buffer capacitor producing a buffer-capacitor voltage that is higher than a threshold voltage of the short-circuit path to thereby transition the short-circuit path from the first state to the second state, the short-circuit path in the second state causing a current through the high-voltage bus to increase above a current rating of one or more respective fuses to electrically disconnect one or more respective batteries from the high-voltage bus, the one or more respective batteries causing the voltage of the high-voltage bus to be higher than the threshold voltage.

* * * * *